Aug. 8, 1939. A. F. WHITE Re. 21,172

CONTINUOUS CONVEYER

Original Filed April 22, 1938

Inventor
A. F. White
By J. Edw. Mayba
ATTY

Reissued Aug. 8, 1939

Re. 21,172

UNITED STATES PATENT OFFICE 21,172

CONTINUOUS CONVEYER

Albert F. White, Toronto, Ontario, Canada

Original No. 2,138,671, dated November 29, 1938, Serial No. 203,492, April 22, 1938. Application for reissue May 24, 1939, Serial No. 275,550

14 Claims. (Cl. 198—168)

This invention relates to a continuous flow conveyer having conveyer chains moving in closed conduits for conveying grain and other bulk material that can be poured.

Conveyers of the above general type are known in which flights substantially filling the cross section of the conveyer casing are employed and are rigidly secured to the links of the conveyer chain at right angles thereto. When such conveyers are used with the rising leg at or near the vertical, trouble is often experienced in completely clearing the flights of their load when they arrive at the discharge opening of the rising leg.

So also when warping or bending of part of the casing occurs in the plane of the chain carrying sprocket, extra friction is created between the flights and casing since the chain tends to move in a straight line to the driving sprocket while the flights must follow the bends of the casing.

The discharging trouble may be overcome in part at least by inclining the flights from back to front with reference to the rising leg as in my prior United States Patent No. 2,066,866, dated January 5, 1937, but the second trouble will remain.

My object therefore is to devise a continuous flow conveyer which will overcome both the troubles referred to without material increase in the cost of the apparatus.

I attain my object by means of constructions which may be briefly described as follows. The conveyer casing is formed with a substantially entirely closed rising leg and a bottom loop and has an inlet to the loop and a front outlet in the rising leg. In the casing there is movably mounted a conveyer element comprising an endless chain having substantially flat flights hung therefrom by means of short hangers which are fixed to the flights and are pivotally secured to the chain. Just above the outlet is positioned a sprocket wheel carrying the chain and having its teeth pitched apart to cooperate with the chain links and so that each successive flight as it reaches the sprocket wheel is caught by a tooth of the sprocket and is tilted to spill any material remaining thereon after the flight has passed the outlet.

Figure 1:
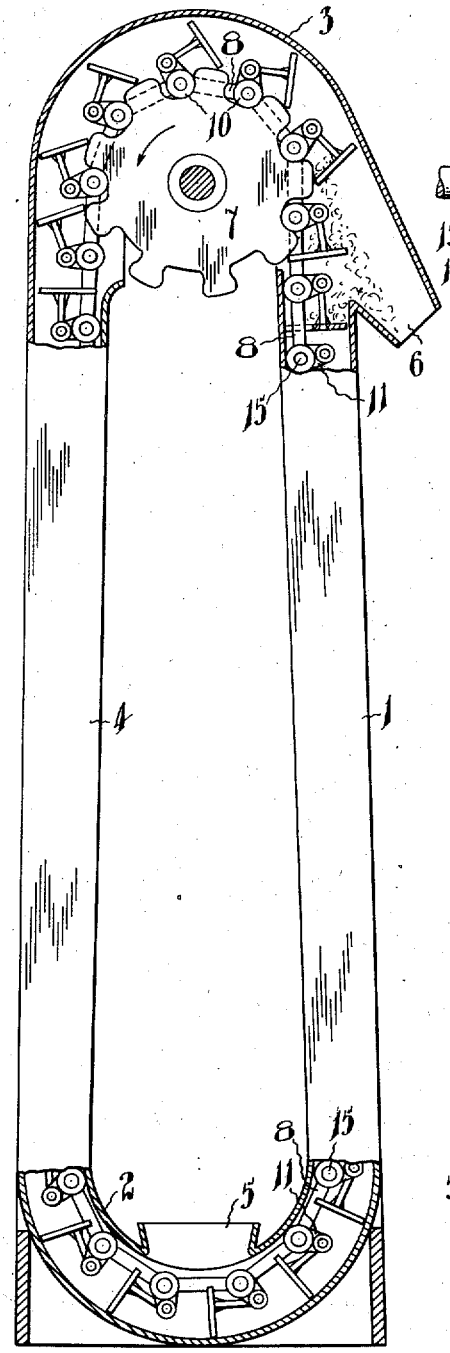
Figure 2:
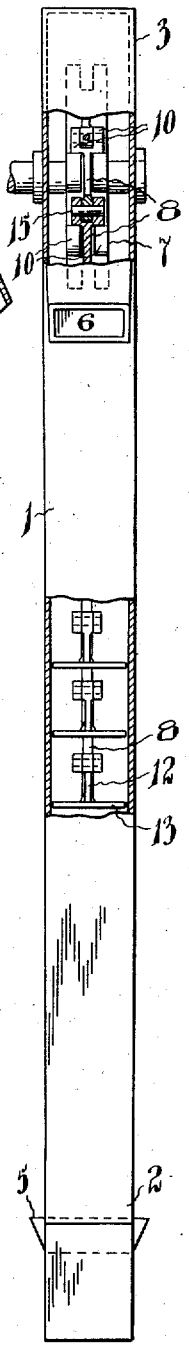
Figure 3:
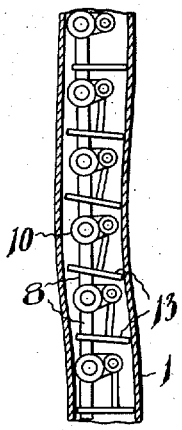
Figure 4:
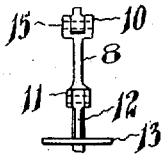
Figure 5:
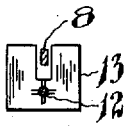

The invention is hereinafter more fully described and is illustrated in the accompanying drawing in which Fig. 1 is a side elevation, partly in section, of my improved elevator;

Fig. 2 a front elevation of the same, partly broken away;

Fig. 3 a side elevation of part of a bent rising leg, showing the adaptation of the conveyer flights thereto;

Fig. 4 a detail in front elevation of a link and connected flight;

Fig. 5 a plan view of the same parts; and

Figure 6:
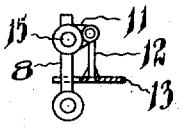

Fig. 6 a side view of the same parts.

In the drawing like numerals of reference indicate corresponding parts in the different figures.

The apparatus comprises a conveyer casing and a conveyer element operating therein. The casing may be of any ordinary construction and will usually be rectangular in cross section. While the shape of the casing may vary in the arrangement of its parts, it is shown as comprising a rising leg 1 and a descending leg 4 connected at the top by the top loop 3 and at the bottom by the bottom loop 2. The bottom loop 2 is formed with the inlet 5, while at the upper end of the rising leg 1 is located the outlet or discharge 6. The rising leg 1 of the conveyer casing is shown as vertical, but it will be understood that it may lie at different angles to the horizontal plane and still fall within the scope of my invention.

Within the upper loop is positioned the sprocket wheel 7 by means of which the elevator elements will usually be driven. It will not usually be necessary to locate a sprocket wheel at the lower loop.

The conveyer or draft element or mechanism comprises an endless chain mounted to move longitudinally of the casing and to be driven by the sprocket wheel 7 and flights carried by the chain.

The chain is formed of the rigid links 8 which are preferably arranged as follows. Each link is shown as formed with a double hinge knuckle at its upper end and a single hinge knuckle or eye at its lower end, the links being pivotally connected by the pins 15. Integral with the lower end or single knuckle of each link is a short arm 11 which extends towards the forward side of the chain having reference to its position in the rising leg. Pivotally connected with each short arm 11 is the short hanger 12, the lower end of which is secured to a flight 13, preferably as near the centre of the same as possible. Each flight, it will be noted, has a gap cut in its rear side to pass on either side of the links 8 of the conveyer chain. However, it approximately fills the cross section of the rising leg 1. That is, grain or other bulk material will not form a continuous material mass or column in said leg 1, but said material will be segregated between successive flights 13.

As will be seen on reference to Fig. 2, the sprocket wheel 7 is double and therebetween pass the links 8, the double knuckles 10 of the links engaging the teeth of each part of the sprocket.

It will be noted particularly on reference to Fig. 1 of the drawing that the rear sides of the flights are so positioned and the teeth of the sprocket wheel are of such a length that, when a flight reaches a position just above the outlet 6, the rear edge of a flight catches on one of the teeth of the sprocket wheel, as shown, which tilts the flight so as to dump any material remaining thereon after the main load has passed off by gravity down the outlet 6. Perfect discharge of the load is thus obtained when the rising leg is in a vertical position, as shown, and also, of course, in any angular position intermediate, the vertical and horizontal.

Another advantage of the freely suspended flights is shown in Fig. 3 in which the casing is shown bent in a direction from back to front.

While the chain under the strain to which it is subjected tends to travel in a direct line and carry the flights with it, the latter being freely hung can swing to thus avoid extra heavy friction against the convex sides of the interior of the casing, as provided by the depth of the gap or opening in each flight 13 through which a link 8 passes. That is, each such gap or opening is of such depth and of such size that it is larger than the cross-sectional area of the chain 8 whereby each flight 13 can freely swing or pivot relative to the chain while approximately filling the cross section of the casing as the chain moves toward and from the walls of said casing in passing therethrough.

It must be understood, however, that various modifications of the invention might readily be devised using the same principle which is the suspension of the flights by means of rigid arms from the links of the conveyer chain.

What I claim as my invention is:

1. A continuous flow elevator comprising a casing including a substantially entirely enclosed rising leg having an inlet and an outlet above the inlet, and a conveyer element comprising an endless chain mounted to move longitudinally of the casing, a plurality of conveyer flights each closely confined on all sides by the rising leg and guided thereby, and hangers rigidly secured to the flights and pivotally connected to the chain, each of said flights hanging free to swing relative to said chain while passing through said rising leg while each is confined and guided thereby as aforesaid.

2. An elevator according to claim 1 in which means is provided to tilt the successive flights adjacent the outlet.

3. A continuous flow elevator comprising a casing including a substantially entirely enclosed rising leg having an inlet and an outlet above the inlet; and a conveyer element comprising an endless chain mounted to move longitudinally of the casing, and formed of rigid pivotally connected links, a plurality of short arms rigidly connected to the said links and extending forwardly having reference to the rising leg of the elevator, a plurality of conveyor flights each closely confined on all sides by the rising leg and guided thereby, and hangers each rigidly secured to a flight and pivoted to the free end of one of the short arms, each of said flights hanging free to swing relative to said chain while passing through said rising leg while each is confined and guided thereby as aforesaid.

4. A continuous flow elevator comprising a casing including a substantially entirely enclosed rising leg having an inlet and an outlet above the inlet, and a conveyer element comprising an endless chain mounted to move longitudinally of the casing and formed of rigid pivotally connected links, a plurality of short arms one rigidly connected to each of said links at one end thereof and extending forwardly having reference to the rising leg of the elevator, a plurality of conveyer flights each closely confined on all sides by the rising leg and guided thereby, and hangers each rigidly secured to a flight and pivoted to the free end of one of the short arms, each of said flights hanging free to swing relative to said chain while passing through said rising leg while each is confined and guided thereby as aforesaid.

5. An elevator according to claim 4 in which means is provided to tilt the successive flights adjacent the outlet.

6. An elevator according to claim 1 in which a sprocket wheel is provided above the outlet and with which the chain meshes, the ends of the teeth of the sprocket wheel extending to a position in which they engage the rear sides of successive flights to tilt them as they reach the sprocket wheel.

7. An elevator according to claim 4 in which a sprocket wheel is provided above the outlet and with which the chain meshes, the ends of the teeth of the sprocket wheel extending to a position in which they engage the rear sides of successive flights to tilt them as they reach the sprocket wheel.

8. A conveyer for transporting bulk material, comprising a substantially entirely enclosing conveyer casing disposed in a desired circuit having relatively continuous side walls along which the material being transported moves and provided with inlet and discharge openings, and a chain conveyer mechanism operating in said casing, said chain conveyer mechanism comprising an endless chain having trailing flights pivotally attached thereto, said flights approximately filling the cross section of the casing between the inlet and discharge openings and having openings larger than the chain cross-sectional area to provide for pivotal movement thereof relative to such chain while conveying material between said inlet and discharge openings.

9. A conveyer for transporting bulk material, comprising a substantially entirely enclosing conveyer casing disposed in a desired circuit having relatively continuous side walls along which the material being transported moves and provided with inlet and discharge openings, and a chain conveyer mechanism operating in said casing, said chain conveyer mechanism comprising an endless chain having trailing flights pivotally attached thereto, said flights being so constructed that the peripheries thereof have a relatively close fit with said casing between said inlet and discharge openings so the path of said flights is determined by the contour of said casing between said openings and having openings larger than the chain cross-sectional area to provide for pivotal movement thereof relative to said chain while conveying material between said inlet and discharge openings.

10. A conveyer for granular material comprising a casing having inlet and discharge openings between which is a substantially entirely enclosing working leg of substantially uniform area of cross section, endless draft mechanism extending through said leg, and trailing flights pivoted to said endless draft mechanism, said flight being guided in all lateral directions with respect to the axis of said working leg by relatively close positioning with the adjacent casing wall in said working leg, said flights including means constructed and arranged to provide for their pivotal movement relative to said endless draft mechanism while moving through said working leg.

11. A conveyer comprising a casing providing a substantially entirely enclosing working leg between inlet and discharge openings, said leg being bent between said openings, endless draft mechanism extending through said working leg, flights having peripheries adjacent said leg walls and confined against lateral movement relative thereto by said leg walls, and means pivotally attaching said flights to said draft mechanism the point of pivotal connection being ahead of said flights in the direction of normal movement of said draft mechanism, said flights having openings through which the draft mechanism loosely passes to provide for lateral movement thereof relative to said draft mechanism within said working leg.

12. A conveyer mechanism comprising a casing providing a substantially entirely enclosing working leg between inlet and discharge openings, said leg being bent between said openings, endless draft mechanism extending through said working leg, flights having peripheries adjacent said leg walls and confined against lateral movement relative thereto by said leg walls, and means pivotally attaching said flights to said draft mechanism in trailing relation relative thereto, said flights being slotted to receive the draft mechanism loosely thereby to provide for lateral movement thereof relative to said draft mechanism within said working leg.

13. A conveyer mechanism comprising a substantially entirely enclosing casing of irregular contour at least one portion of which is disposed at an angle to the horizontal, said casing having inlet and outlet openings, a conveyer element adapted to be moved in an endless path and within the casing, and material carrying trailing flights pivotally connected to said conveyer element and having openings for freely receiving said conveyer element thereby providing for movement relative thereto while conveying material between said openings, said flights being confined against lateral movement relative to said casing.

14. A conveyer mechanism comprising a substantially continuous wall enclosing casing of irregular contour, openings in said casing for feeding and discharging material, a conveyer element adapted to be moved in an endless path and within the casing, material carrying trailing flights pivotally connected to said conveyer element and having openings therein through which said conveyer element freely passes, and means in close proximity to said discharge opening adapted to tilt said flights for discharging their load.

ALBERT F. WHITE.